(12) United States Patent
Doyle et al.

(10) Patent No.: US 9,087,392 B2
(45) Date of Patent: Jul. 21, 2015

(54) TECHNIQUES FOR EFFICIENT GPU TRIANGLE LIST ADJACENCY DETECTION AND HANDLING

(71) Applicant: Intel Corporation, Santa Clara, CA (US)

(72) Inventors: Peter L. Doyle, El Dorado Hills, CA (US); Thomas A. Piazza, Granite Bay, CA (US)

(73) Assignee: INTEL CORPORATION, Santa Clara, CA (US)

( * ) Notice: Subject to any disclaimer, the term of this patent is extended or adjusted under 35 U.S.C. 154(b) by 282 days.

(21) Appl. No.: 13/627,699

(22) Filed: Sep. 26, 2012

(65) Prior Publication Data
US 2014/0085302 A1     Mar. 27, 2014

(51) Int. Cl.
G06T 1/60       (2006.01)
G06T 15/00     (2011.01)
G06T 17/20     (2006.01)

(52) U.S. Cl.
CPC ............... *G06T 1/60* (2013.01); *G06T 15/005* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 5,408,605 | A * | 4/1995 | Deering | 345/501 |
| 7,038,692 | B1 * | 5/2006 | Priem et al. | 345/557 |
| 8,558,842 | B1 * | 10/2013 | Johnson et al. | 345/581 |
| 2008/0094408 | A1 * | 4/2008 | Yin et al. | 345/581 |
| 2009/0073177 | A1 * | 3/2009 | Jiao et al. | 345/501 |

OTHER PUBLICATIONS

Shuchi Chawla, Dalibor Zeleny, Xiaoyong Chai, "CS787: Advanced Algorithms; Topic: Caching Algorithms", Oct. 31, 2007, Lecture Notes, pp. 1-6.*

* cited by examiner

*Primary Examiner* — Ulka Chauhan
*Assistant Examiner* — Robert Bader
(74) *Attorney, Agent, or Firm* — Kacvinsky Daisak Bluni PLLC

(57) ABSTRACT

An apparatus may include a memory to store a set of triangle vertices in a triangle, a processor circuit coupled to the memory and a cache to cache a set of triangle vertex indices corresponding to triangle vertices most recently transmitted through a graphics pipeline. The apparatus may also include an autostrip vertex processing component operative on the processor circuit to receive from the memory the set of triangle vertices, compare an index for each vertex of the set of triangle vertices to determine matches to the set of cached triangle vertex indices, and shift a single vertex index into the cache, the single vertex index corresponding to a vertex miss in which a given vertex of the set of triangle vertices does not match any vertex index of the set of cached triangle vertex indices when exactly two matches to the set of cached triangle vertex indices are found.

24 Claims, 11 Drawing Sheets

TECHNIQUES FOR EFFICIENT GPU TRIANGLE LIST ADJACENCY DETECTION AND HANDLING

BACKGROUND

In processing data to generate an image, graphics processor (GPU) performance and power consumption is directly related to the choice of input topology used to model the objects presented in an image. In the present day, graphics processors typically render images using triangles as primitives. A major factor that defines the efficiency of image generation is the number of vertices required to describe the scene, e.g., the average number of vertices required to define a triangle. This is based on several factors, but is primarily due to the fact that GPUs typically transmit one vertex along a fixed-function geometry pipeline every clock. The practice of passing multiple vertices down the geometry pipeline in one clock is generally prohibitive with respect to semiconductor die area and power consumption. This is due to the amount of information associated with each vertex, the considerable length of the fixed-function geometry pipeline, and the complexity of processing input topologies to packets of a fixed number of vertices. In addition, the ability to process multiple vertices per clock is not always required, and therefore such practice may unnecessarily consume power and processor real estate.

Because of these considerations, the use of triangle strips to render images provides distinct advantages. A triangle strip is a series of connected triangles that share vertices, where each new vertex implicitly defines a new triangle. Triangle strips are used to accelerate the rendering of objects represented as triangle meshes. If the triangle strip (tristrip) topology is used, except for the first two vertices, each subsequent vertex defines a complete triangle. This contrasts with the so-called triangle list (trilist) topology, which renders each triangle separately and thereby requires three vertices to define a single triangle. Thus, in principle, the number of vertices sent to the GPU to define n triangles in a mesh may be reduced from 3n to n+2 in the best case.

Nonetheless, current graphics processing applications including 3D graphics almost exclusively use trilist input topologies even though there is generally a high-level of connectivity between triangles in the trilists. There are several reasons for the persistence of trilist topology including but not limited to the following: 1) tristrip topologies only allow subsequent triangles to connect to the strip at the last submitted edge and this restrictive adjacency limits their usefulness in modeling complex shapes; 2) tristrip topologies tend to be rather short (few vertices) when used to directly model objects, which may yield poor performance due to driver and GPU overhead Draw-Call overhead and the limited opportunity to amortize this overhead over the few triangles typically generated within each object of the topology; 3) Historically, 3D application programming interfaces (APIs) did not directly support packing multiple, variable-length tristrips in a draw call.

On the other hand, use of trilist topologies typically lead to performance and power consumption issues, including but not limited to the following: 1) Most GPUs incorporate VertexShader (VS) cache in order to limit redundant vertex shading. Although vertices in a trilist topology with significant spatial coherency benefit from this VS cache, each triangle requires three VS cache lookups that consume power; 2) vertices that hit in the VS cache still need to be buffered within the vertex shader stage until the shading of all preceding "miss" vertices has completed, which buffering consumes die area and power; 3) Vertices that hit in the VS cache also require updates to the corresponding vertex reference counts to account for the additional vertex references sent down the pipeline, which further consumes power; 4) Each vertex passed down the pipeline consumes some amount of dynamic power due to buffering within/between stages, etc; and 5) Following the vertex shading stage of the pipeline, complete triangles need to be assembled for per-triangle operations such as clip-testing, cull-testing and triangle setup stages; 6) Finally, as noted use of trilist topologies lead to maximum processing rate of one triangle per three clocks as vertices arrive at a rate of one triangle per clock.

Given the tradeoffs mentioned above there may be a need for improved techniques and apparatus to solve these and other problems.

DETAILED DESCRIPTION

The present embodiments are related to architecture and methods for improved processing in a graphics pipeline. In particular, the present embodiments involve treatment of triangle primitives to improve absolute geometry fixed-function performance in a GPU, such as triangle cull and setup rates, as well as to improve GPU performance/power by processing triangle list topologies faster and more efficiently.

In the present embodiments, an Auto-Stripification (also referred to herein as "autostrip" herein) feature is provided, which, unlike tristrip topologies, is operative in GPU hardware to automatically detect general triangle connectivity within a window of N most-recently processed vertices. In particular, as detailed below, the present embodiments extend beyond the implicit triangle connectivity of a tristrip topology to comprehend more general triangle connectivity within trilists, while avoiding the performance and power consumption impact associated with trilist topology.

In various embodiments, an autostrip vertex cache is provided within a geometry pipeline of a processor, such as a graphics processor. In particular embodiments, the autostrip vertex cache is a fully-associative, vertex-based cache that is operative to record pipeline information associated with vertices most recently processed by the geometry pipeline, and in particular, with the last N trilist vertices, where N represents an integer larger than one.

As detailed below, input vertex indices may be used as cache tags in the autostrip vertex cache, which may be employed exclusively for trilist topology processing. Trilist triangle vertices that hit in the autostrip vertex cache can subsequently be referenced simply by the relative location (index) within the cache. Given the small cache size and correspondingly small index values, in some embodiments the fixed-function pipeline data can be extended to pass two of these autostrip vertex cache indices and some control information alongside the existing vertex information. The additional control information may indicate this pipeline data as an "AutoStripTriangle" primitive type. This allows a complete trilist triangle description to be passed down the pipeline within each clock, as opposed to conventional processing in which 3 clocks are required to pass each trilist triangle. It is to be noted that the term "clock" as used herein may refer to any convenient period, and may vary according to GPU design.

Figure 1:
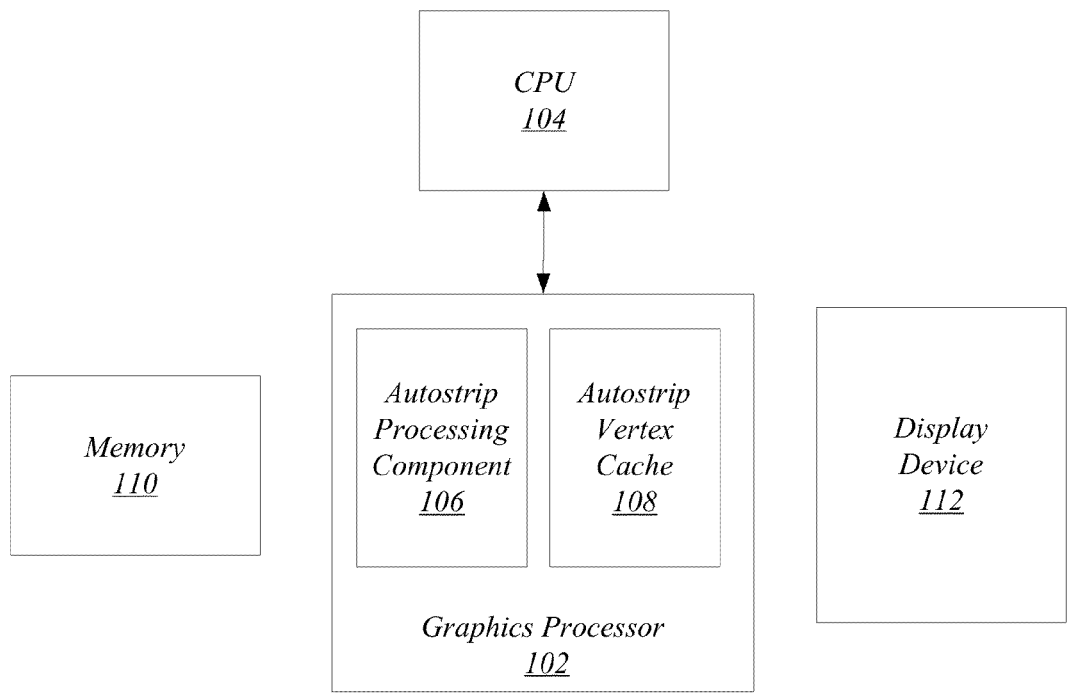
FIG. 1 illustrates a block diagram for an exemplary apparatus.

FIG. 1 depicts one example of architecture for an apparatus 100 consistent with the present embodiments. A graphics processor 102 (also termed "GPU") is coupled to a general processor (CPU) 104, which may issue commands and data to the GPU 102 during processing for images to be presented on the display device 112. In different embodiments the CPU 104 may be disposed within the same semiconductor die or within a separate die as that of the GPU. The apparatus 100 of FIG. 1 may be embodied, for example, in a laptop computer, tablet computing device, desktop computer, smartphone, cellular telephone or other electronic computing device or communications device, a television (TV), or videogame device. The embodiments are not limited in this context.

In particular, in various embodiments the GPU 102 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Examples of a display device 112 include a liquid crystal display (LCD), light emitting diode display (LED), touch sensitive display, plasma display, cathode ray tube, and other display types.

As further illustrated in FIG. 1, the GPU 102 may include an autostrip processing component 106 and an autostrip vertex cache 108. The autostrip processing component 106 may be embodied in hardware, software, or a combination of hardware and software, and may be operative on the GPU 102 to perform various processing functions related to vertex processing as detailed below.

Figure 2:
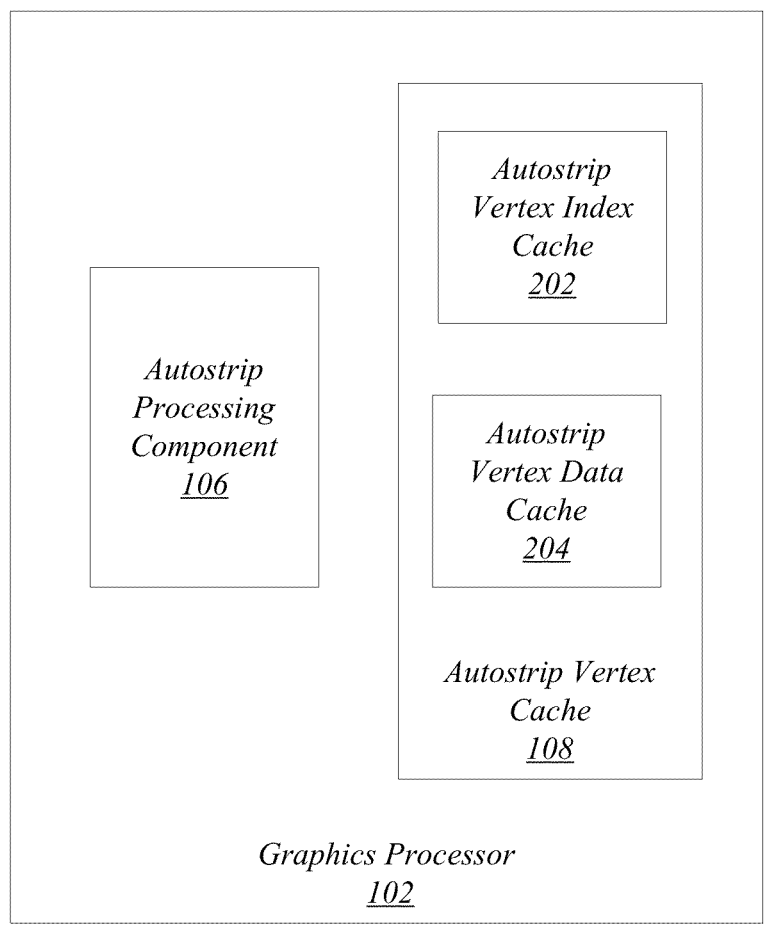
FIG. 2 depicts a block diagram of an exemplary component of the apparatus of FIG. 1.

FIG. 2 depicts one embodiment of the autostrip vertex cache 108. In this example, the autostrip vertex cache 108 includes an autostrip vertex index cache 202 and an autostrip vertex data cache 204, whose operation is described in later sections. In general, the autostrip processing component 106 may receive trilist triangle vertices from a memory, such as the memory 110, compare triangle vertex indices of the trilist triangle vertices to indices stored in the autostrip vertex index cache 202, and invalidate the autostrip vertex cache 108 as described herein below.

Consistent with the present embodiments, the autostrip processing component 106 may operate in conjunction with the autostrip vertex index cache 202 to automatically adjust processing of triangle vertex indices based upon how many cache hits take place in the autostrip vertex index cache 202. As detailed below, when fewer than two hits take place, the triangle vertex indices may be processed as trilist triangle, while when two or more hits take place, a shift to "autostrip" processing of the triangle vertex indices is triggered. This facilitates the ability to harness the advantages of both trilist and tristrip processing while avoiding some of the pitfalls of each.

Figure 3A:
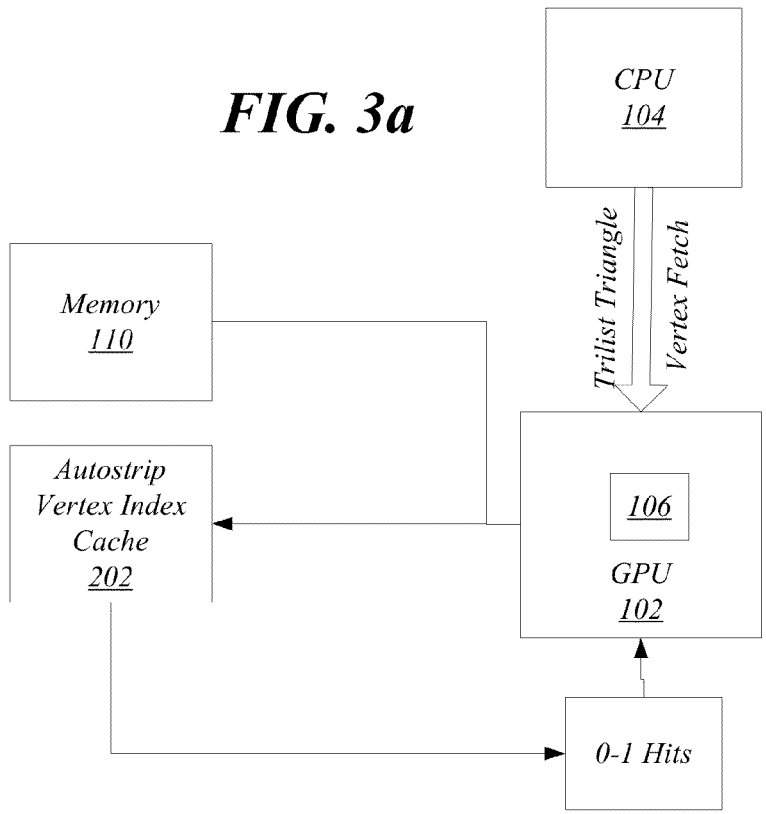
FIGS. 3a and 3b illustrate one scenario of processing triangle list indices consistent with the present embodiments.
Figure 3B:
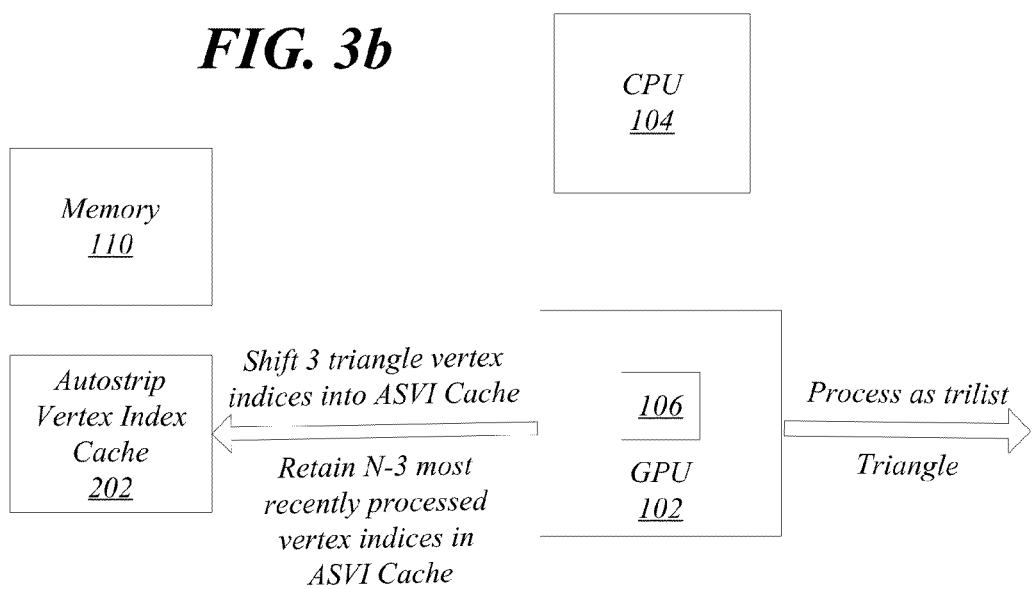

FIGS. 3a and 3b illustrate one scenario of processing triangle list indices consistent with the present embodiments. When triangle vertex indices are input for processing, the GPU 102 may store the triangle vertex indices as cache tags in the autostrip vertex index cache 202, which is depicted separately from GPU 102 although it may form part of the GPU 102. When subsequent trilist triangle vertex indices are fetched, for example, from memory 110, each of the three individual trilist vertex indices are compared with indices stored in the autostrip vertex index cache 202, which results in a hit/miss indication for each vertex index.

In particular, during the vertex fetch stage illustrated in FIG. 3a, the autostrip vertex index cache 202 may be arranged with a set of cache tags, in which the index of a vertex (as read from the index buffer in memory 110) serves as tag data for a given cache entry. As vertices are processed, the index values of the vertices are considered as tags and are looked-up in cache tag storage of autostrip vertex index cache 202. Each vertex index thereby registers a hit or miss in the tag lookup of the autostrip vertex index cache 202. If a vertex index hits in this cache tag lookup, the result returned represents the location of the matching vertex index in the tag storage. For example, for an autostrip vertex index cache 202 having a cache size of 4, the number returned may range from 0 to 3.

In the example of FIG. 3a, a scenario is shown in which either zero or one cache hit is returned. When the GPU 102 determines that either one or zero cache hits has been returned for the trilist triangle vertex indices being processed, the GPU 102 (auto strip processing component 106) performs multiple actions, as illustrated in FIG. 3b. The three trilist triangle vertex indices are shifted for temporary storage into the autostrip vertex index cache 202. In various embodiments the size N of the autostrip vertex index cache 202 is three or greater. Assuming that any valid cache entries were present in the autostrip vertex index cache 202, when invalidation takes place, the N-3 vertex indices for vertices that were most recently transmitted through and processed in the geometry pipeline remain in the autostrip vertex index cache 202. As used herein in conjunction with triangle vertices, the terms "most recently transmitted" and "most recently processed" refer to a set of vertices that includes the last (most recent) processed vertex, the next most recently processed vertex, and so forth. Accordingly, if N=5, the N most recent vertices includes the last processed vertex, the next to last processed vertex, the third-to-last processed vertex, the fourth-to-last processed vertex, and the fifth-to-last processed vertex.

Because fewer than two cache hits occur in the scenario of FIG. 3a, the input triangle vertex indices cannot be handled according to tristrip processing. Therefore, the three triangle vertices may be further processed similarly to conventional trilist processing in which one vertex of the triangle is processed per clock.

Figure 4A:
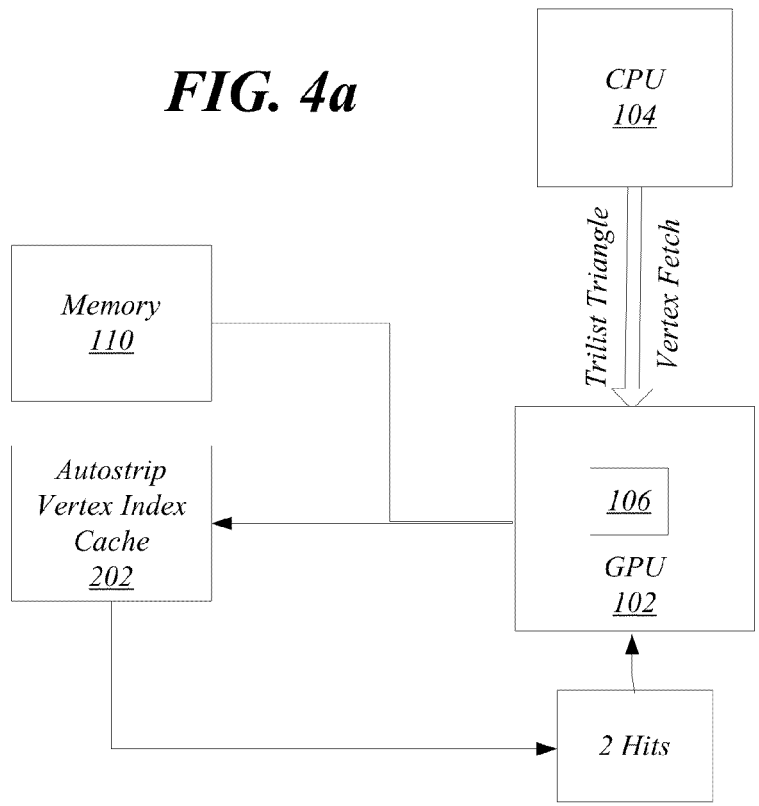
FIGS. 4a and 4b illustrate another scenario of processing triangle list indices consistent with the present embodiments.
Figure 4B:
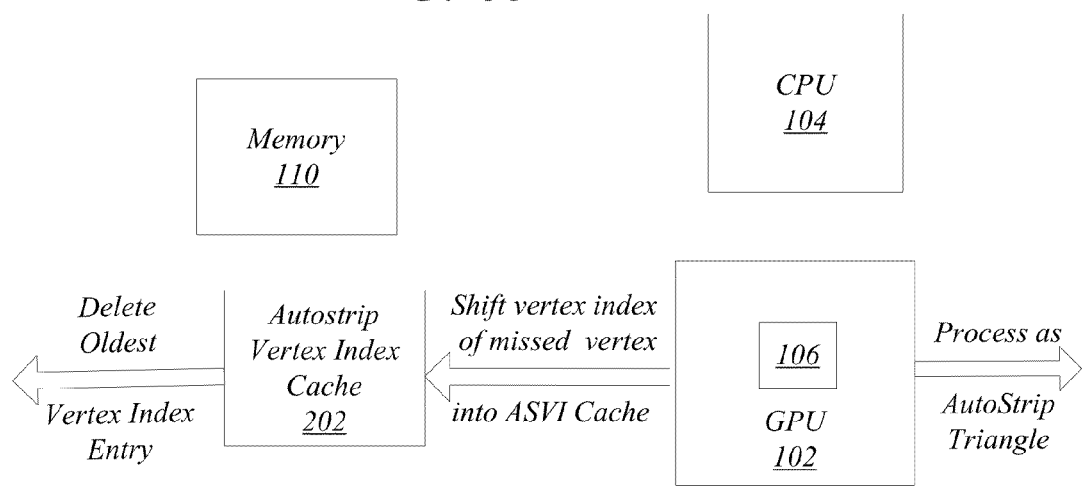

However, when two or more cache hits are returned from the autostrip vertex index cache 202, the present embodiments provide triangle processing that harnesses the power of the tristrip approach. FIGS. 4a and 4b illustrate another scenario of processing triangle list indices consistent with the present embodiments. In the example shown in FIG. 4a, the input triangle is assumed to generate two cache hits in the autostrip vertex index cache 202. As a consequence, as shown in FIG. 4b, the GPU 102 is triggered to perform several actions. For one, the input triangle is converted into an "AutoStripTriangle" primitive type for processing. The AutoStripTriangle primitive includes the vertex of the input triangle that did not hit in the autostrip vertex index cache 202, which may be deemed the "miss" vertex, as well as the indices in the autostrip vertex index cache 202 of the two "hit" vertices for the input triangle. The GPU 102 (autostrip processing component 106) then shifts the vertex index of the miss vertex into the autostrip vertex index cache 202. In so doing, assuming the cache is full, the GPU 102 may also evict the oldest entry in autostrip vertex index cache 202.

Figure 5A:
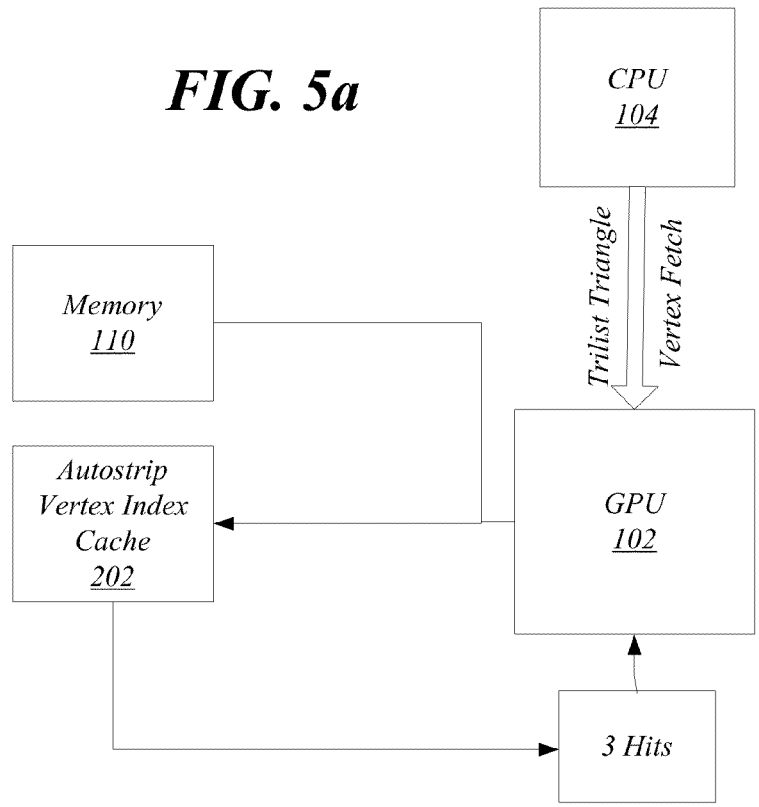
FIGS. 5a and 5b illustrate a further scenario of processing triangle list indices consistent with the present embodiments.
Figure 5B:
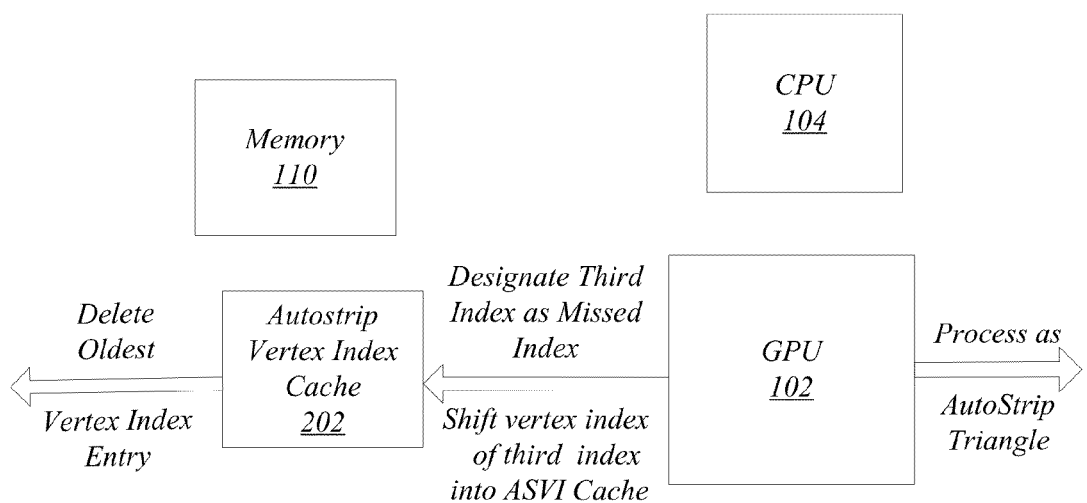

FIGS. 5a and 5b illustrate a further scenario of processing triangle list indices consistent with the present embodiments. In the example shown in FIG. 5a, the input triangle is assumed to generate three cache hits in the autostrip vertex index cache 202. As a consequence, as shown in FIG. 5b, the GPU 102 is triggered to perform several actions. Similarly to the scenario of FIG. 4b for two hits, the input triangle is converted into an "AutoStripTriangle" primitive type for processing. However, in this case, the GPU deems that the third index, although actually providing a hit, was a miss. The processing then proceeds as in FIG. 4b: The GPU 102 shifts the vertex index of the "miss" vertex into the autostrip vertex index cache 202. In so doing, assuming the cache is full, the GPU 102 may also evict the oldest entry in autostrip vertex index cache 202.

Figure 6A:
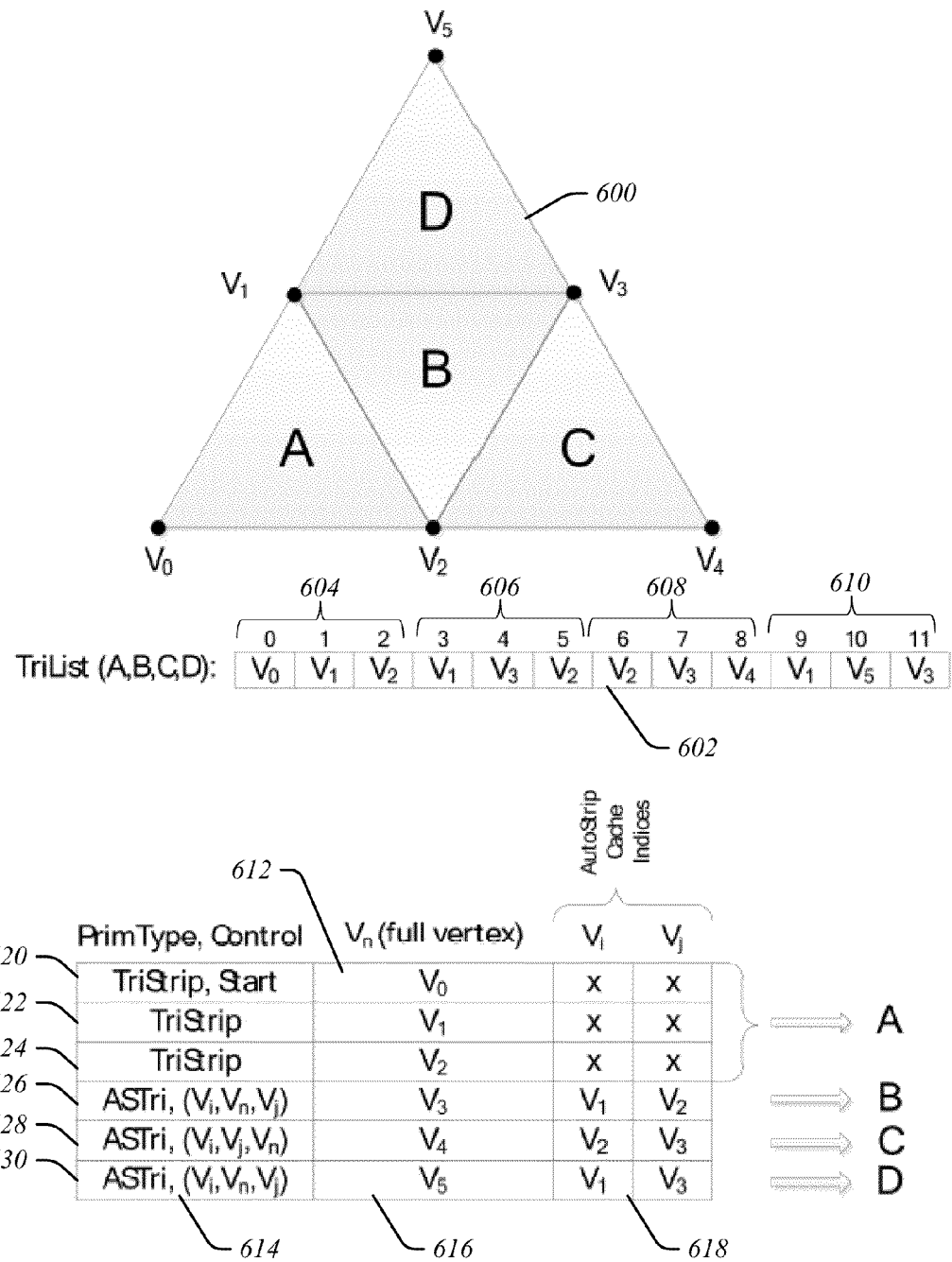
FIG. 6a depicts an example of processing a set of triangles consistent with the present embodiments.

FIG. 6a depicts an example of processing a set of triangles consistent with the present embodiments. In FIG. 6a there is shown an arrangement of four triangles that may constitute a trilist primitive 600, and a corresponding set of trilist vertices 602 that may be input to define the trilist primitive 600. As illustrated, the set of trilist vertices 602 includes four separate trilist triangles 604, 606, 608, and 610, which are alternatively labeled as "A," "B," "C," and "D." To construct the trilist primitive 600 according to trilist topology, the four trilist triangles 604-610 may be input sequentially as shown in the listing provided by the set of trilist vertices 602.

Also depicted in FIG. 6a is a table 612 that illustrates the content that is transmitted along a fixed-function geometry pipeline in order to process the four triangles 604, 606, 608, and 610 in the trilist primitive 600.

The table 612 contains groups of signals to pass Primitive Type/Control information 614 and data 616, which represents a full set of information that the pipeline requires for a given vertex ($V_n$) of a triangle being processed. In the example of FIG. 6a, $n$ may have a value zero or greater. The table 612 also includes autostrip cache index data 618, which contains indices $V_i$ and $V_j$ that include only the autostrip cache indices for the other two vertices of the triangle.

Each row in the table 612 represents a set of data submitted to a pipeline in a different clock. For example, the top row 620 may be the data submitted to the pipeline on the $1^{st}$ clock, the $2^{nd}$ row 622 may be the data submitted on the $2^{nd}$ clock, etc. Accordingly, to provide all the data for the four triangles that constitute the triangle primitive 600, a duration of six clocks is required, which provides in succession the data shown in the rows 620, 622, 624, 626, 628, and 630.

In the table 612, the "full set of information" provided for an entry constitutes the information the pipeline requires to perform computations on the given vertex. Consistent with the present embodiments, and discussed further below, the results of these computations may be subsequently stored (pushed) in the "Data Cache" blocks in clipping/setup stages.

As is evident from table 612, processing of the triangle primitive 600 involves generating an initial triangle in the first three clocks followed by the generation of a new (autostrip) triangle each subsequent clock. In particular, the autostrip processing component 106 may generate Primitive Type/Control information 614 that lists a type of primitive corresponding to the vertex data being processed in a given clock, as well as other control information, if any. In the initial three clocks corresponding to the rows 620, 622, 624, the primitive is indicated as "tristrip" and no other control information is shown. In the fourth clock corresponding to row 626, the control information indicates that the pipeline data corresponds to an "AutoStripTriangle" primitive type. In addition, further control information includes the order of vertices being processed. The order of vertices shown in row 626 is "$V_i$," "$V_n$," and "$V_j$," which indicates, for example, that the "full" vertex is the second vertex, corresponding to $V_3$ in the triangle primitive 600. This order information is required when the triangle is subsequently assembled in preparation for triangle-based processing.

As illustrated in particular by table 612, in the first three clocks, the full vertex information corresponding to $V_n$ includes the vertices $V_0$, $V_1$, and $V_2$, which are used to construct the first triangle "A". No entries are yet populated for the $V_i$ and $V_j$ autostrip cache indices. Beginning with the fourth clock corresponding to row 626, the autostrip cache indices $V_i$ and $V_j$ are populated with entries to construct a subsequent triangle. In row 626, the first index $V_i=V_1$, the second index $V_n=V_3$ and third index $V_j=V_2$ from which the second triangle "B" may be constructed; in row 628, the first index $V_i=V_2$, the second index $V_j=V_3$ and third index $V_n=V_4$ from which the third triangle "C" may be constructed; and so forth.

The triangle processing illustrated in FIG. 6a presents multiple advantages afforded by the present embodiments over conventional triangle processing. As noted, only six clocks are required to generate the triangle primitive 600, in contrast to conventional trilist topology in which a total of twelve clocks are required to construct the triangle primitive 600, at a processing rate of one vertex per clock.

Figure 6B:
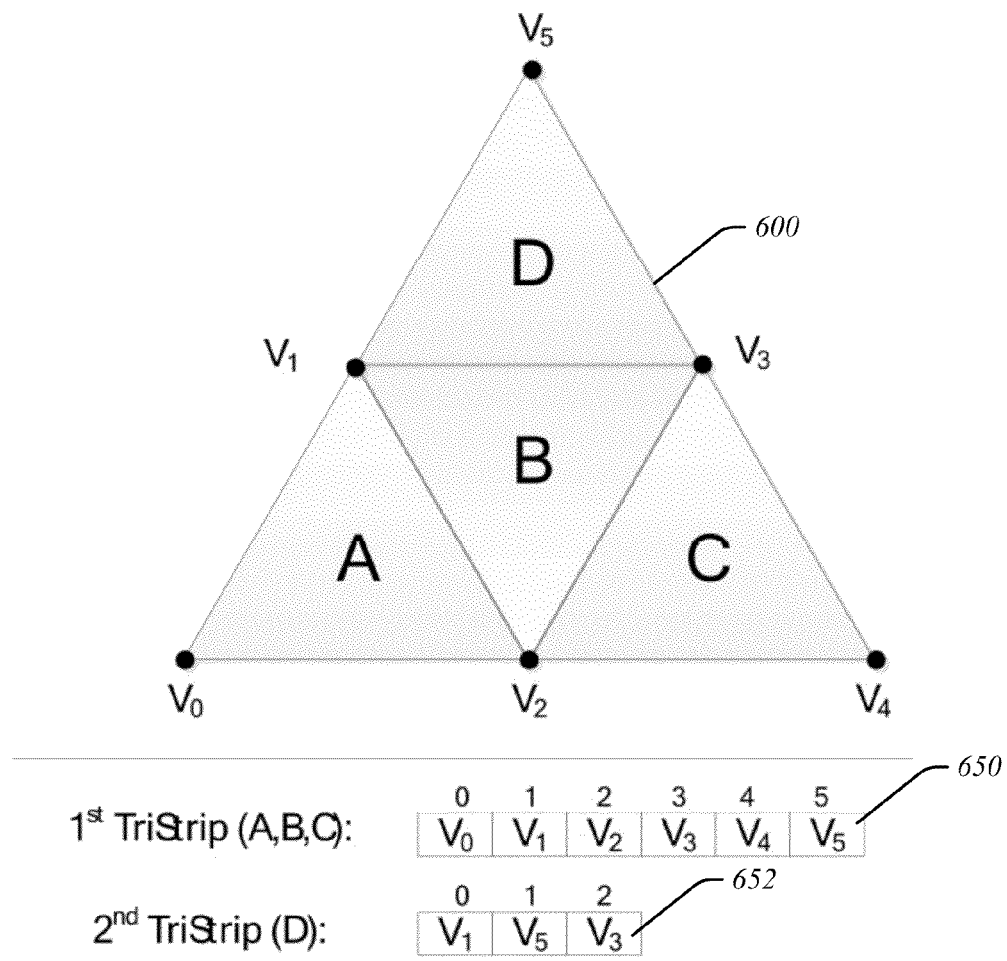
FIG. 6b depicts processing of triangle primitive according to conventional techniques.

In addition, the embodiment shown in FIG. 6a avoids problems associated with conventional tristrip topology for constructing many shapes. To highlight this point FIG. 6b illustrates the processing of triangle primitive 600 according to conventional tristrip topology. In FIG. 6b, it is shown that two separate triangle strips 650 and 652 must be generated to construct the triangle primitive 600 using tristrip topology. As is known, tristrip topologies only allow subsequent triangles to connect to the strip at the last submitted edge, thereby limiting their usefulness in modeling complex shapes. In the example of FIG. 6b, after the triangle "C" is formed having the last edge defined by vertices $V_3$ and $V_4$, the triangle "D" to be constructed involves a vertex $V_5$ that is not connected to the last submitted edge. Therefore a new tristrip 652 is required to be generated that defines separately all three vertices in the triangle "D." Accordingly, a total of 9 clocks are necessary to generate the triangle primitive 600, in addition to processing overhead associated with generating two separate triangle strips. The present embodiments avoid this problem by providing the autostrip cache indices that allow a geometry pipeline to determine the location of previously-computed-and-cached data. Thus, in the clock corresponding to row 630 of table 612, the full vertex $V_5$ is processed together with the autostrip cache indices $V_1$ and $V_3$ to generate the triangle "D."

Figure 7:
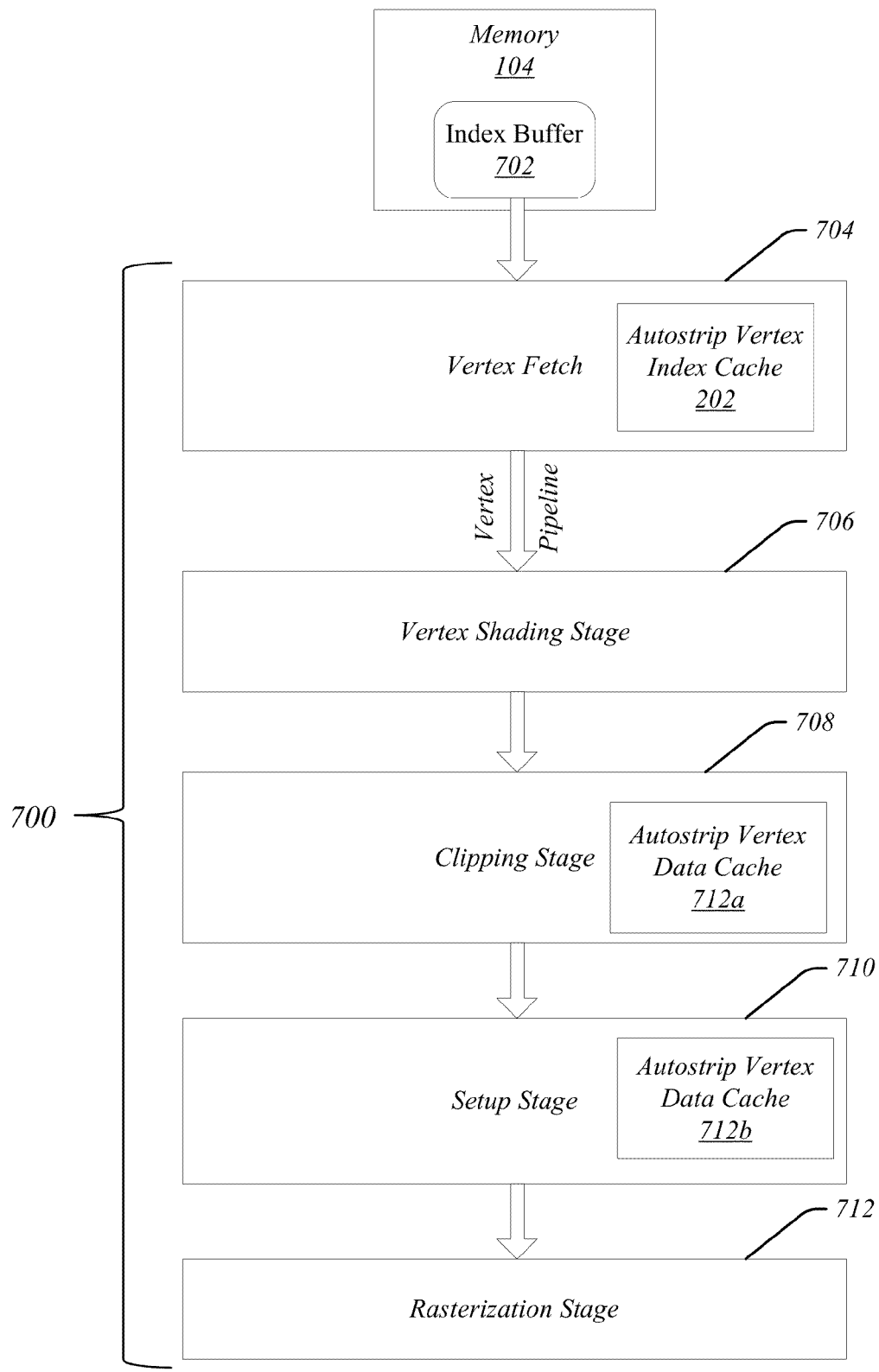
FIG. 7 depicts exemplary features of processing of vertices during multiple stages of a geometry pipeline.

FIG. 7 depicts further features of autostrip processing of vertices during multiple stages of geometry pipeline 700. As generally discussed above, in a vertex fetch stage 704 the autostrip vertex index cache 202 caches autostrip cache tags in which the index of a vertex read serves as tag data. Thus, in initial stages of the geometry pipeline 700, the vertex indices are read from an index buffer, such as index buffer 702.

In various embodiments, subsequent to the vertex fetch stage 704, the geometry pipeline 700 further processes the vertices by taking into account autostrip information. In particular, as illustrated by the vertex shading stage 706, a miss vertex of a triangle may be subject to Vertex Shader processing, including performing a lookup in a vertex shader cache (not shown). The AutoStrip-related information may remain associated with the miss vertex until the miss vertex subsequently exits the vertex shading stage 706 as an autostrip primitive type.

Notably, as discussed above, the AutoStrip primitive "hit" vertices are only specified via an autostrip vertex index cache 202 as opposed to the additional information used to specify the "miss" vertex. Accordingly, relevant downstream units for processing the hit vertices are likewise required to cache any necessary information resulting from the previous processing of these vertices when they were sent down the geometry pipeline.

In the example of FIG. 7, in the Clipping stage 708 of the geometry pipeline 700, the computed vertex position(s) and results of vertex clip testing may be cached in an autostrip vertex data cache 712a. Likewise, information obtained and/or generated for a vertex in the Setup stage 710 may also be cached in the autostrip vertex data cache 712b. This caching may be performed so that the caching parallels the behavior of the autostrip vertex index cache 202 so that the indices provided in the autostrip primitive correspond to the appropriate cached vertex information. The caching of this information parallels the information retention of the two previous vertices required for tristrip triangle processing, and in particular may be a simple extension of existing tristrip information caching Although depicted as separate caches, consistent with the present embodiments, autostrip vertex index cache 202 and autostrip vertex data cache 712a, 712b may form part of the same cache, such as an "autostrip vertex cache." In particular, the autostrip vertex index cache 202 may represent a tag portion of the autostrip vertex cache (not separately shown) while the autostrip vertex data cache 712a, 712b represents the data portion of the autostrip vertex cache.

Figure 8:
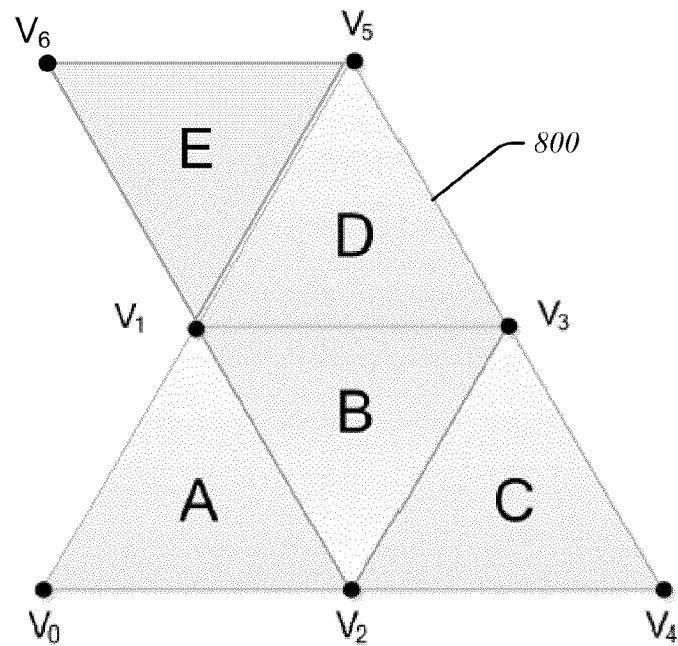
FIG. 8 depicts another example of processing a set of triangles consistent with the present embodiments.
Figure 8:
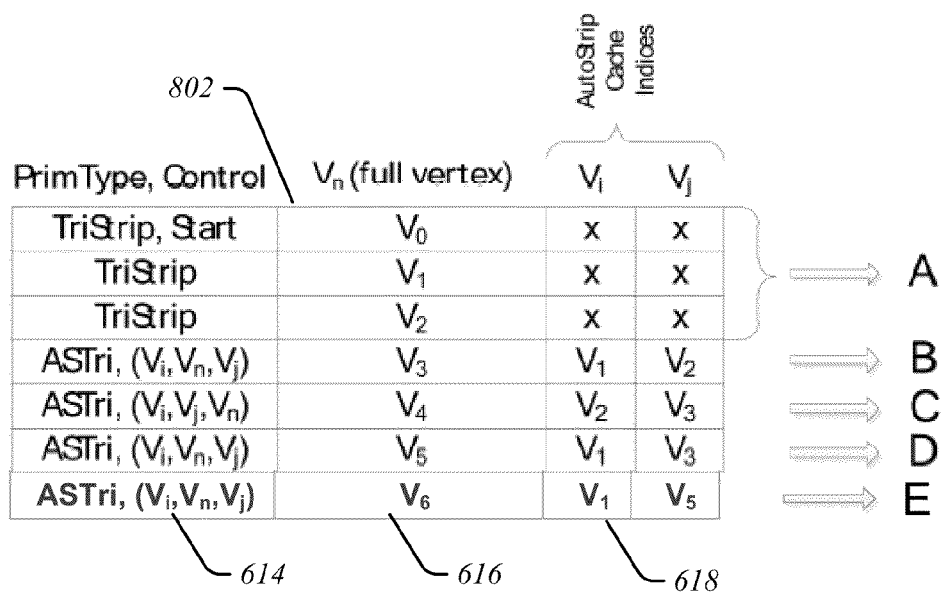

In various embodiments, the size of an autostrip vertex cache may be arranged to balance the need for a small cache size with the ability to model more complex shapes in a single autostrip sequence. Thus, as the value of the cache size N increases, more vertex indices may be stored in an autostrip vertex index cache 202, which allows more complex shapes to be modeled. For example, referring to FIG. 6a once more, it may be determined to add to the triangle primitive 600 an additional triangle containing an additional vertex $V_6$ and adjacent vertices $V_5$ and $V_1$. FIG. 8 depicts an example of processing a set of triangles consistent with the present embodiments. In this case, the arrangement 800 of FIG. 8 builds on the triangle primitive 600 by adding an additional triangle "E."

Because general triangle connectivity is determined based upon the N most-recently processed vertices, the new triangle based upon vertex $V_6$ may be generated if both $V_5$ and $V_1$ are present in the entries $V_i$ or $V_j$ in the autostrip cache index data 618 of the table 802. Accordingly, in order that $V_1$ be retained as an index in the autostrip cache index data 618 during processing of the vertex $V_6$, N must have a value greater than 5. As shown in FIG. 8, the number of rows, which is equivalent to the value of N, is seven. Accordingly, the vertex $V_1$ is retained so that the additional triangle "E," whose vertices are $V_1$, $V_5$ and $V_6$, can be processed as an autostrip triangle.

On the other hand, the performance gained by increasing the value of N may be balanced by considerations of cache size. A study of graphics workloads has shown that >50% of triangles within trilist topologies share at least two vertices with the immediately preceding triangle. Therefore, if the pipeline cached information is stored for the previous three trilist vertices, in more than 50% of triangle processing cases it should be possible to handle a next triangle as an AutoStrip-Triangle that only requires one full vertex description. Based on the study, the overall processing performance of the trilist topologies should approach/surpass two 2× clocks/triangle instead of three 2× clocks/triangle afforded by conventional processing. The study has also shown that when the number of vertices cached (N) increases from 3 to 5, the percentage of trilist triangles that are amenable to autostrip processing as described herein generally increases only slightly. In the cases studied, the typical fraction of trilist triangles amenable to autostrip processing is about 40 to 80% for N=3, and typically increases in the range of a few percent to about ten percent when N is increased to a value of 5. Accordingly, in some embodiments a cache size of three to five may provide an effective performance enhancement without incurring an undue real estate penalty.

In a further study, it was found that the number of vertex shader cache accesses was only about 56% when an autostrip processing of input triangles was performed as opposed to triangle process processing employing conventional trilist topology. Moreover, the average number of cases in which a miss generates a reshading of a vertex increases only marginally using autostrip processing, which increase is only due to the large decrease in total cache accesses.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
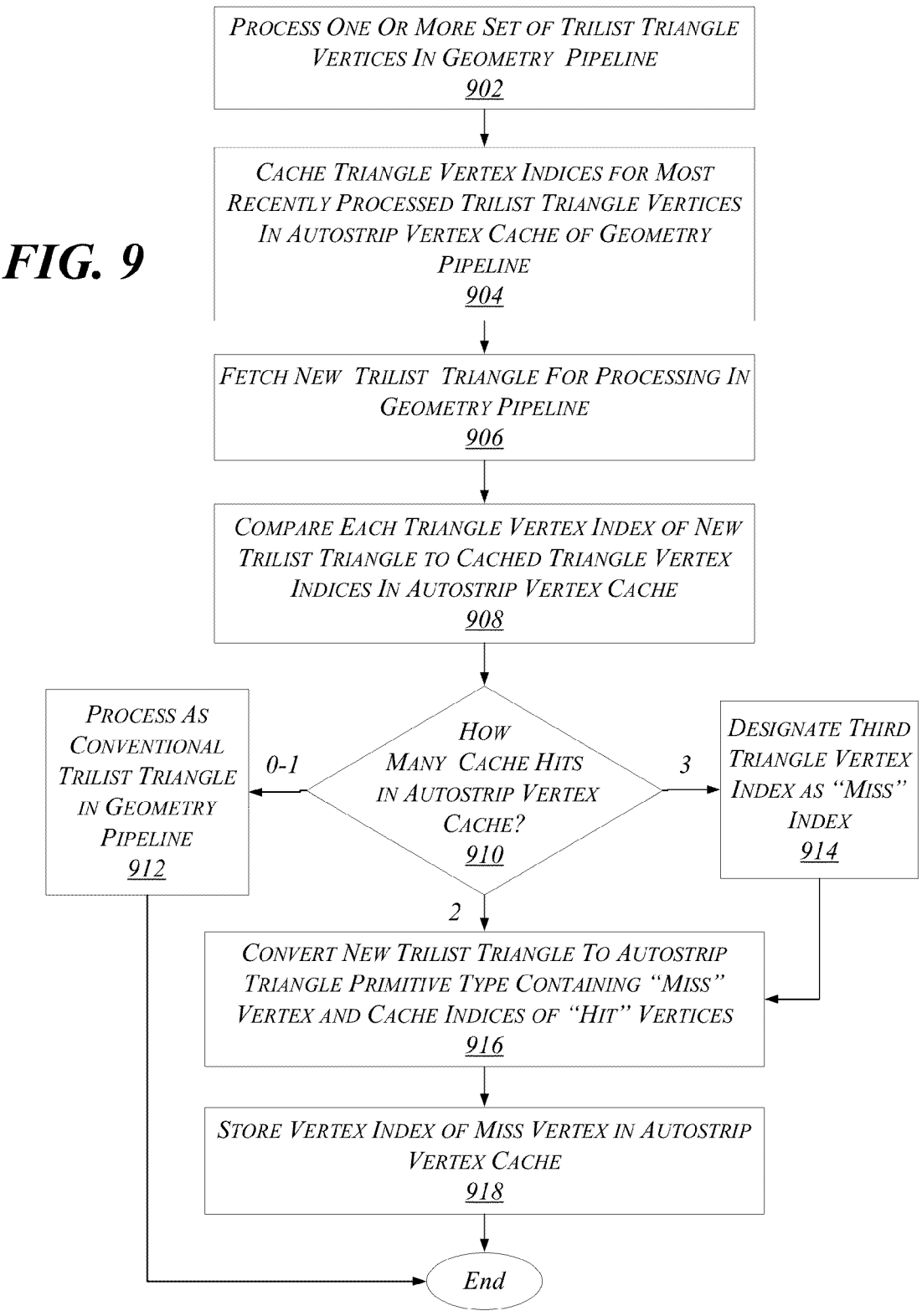
FIG. 9 presents an exemplary first logic flow.

FIG. 9 depicts an exemplary first logic flow 900. At block 902 one or more sets of trilist triangle vertices are processed in a geometry pipeline. The geometry pipeline may include, for example, a vertex fetch stage, vertex shading stage, clipping stage, setup stage, and rasterization stage. At block 904, triangle vertex indices are cached for the most recently processed trilist triangle vertices in the geometry pipeline. The triangle vertex indices are cached in an autostrip vertex cache arranged for use by the geometry pipeline. The flow then proceeds to block 906.

At block 906, a new trilist triangle is fetched for processing in the geometry pipeline. At block 908, each of three triangle vertex indices of the new trilist triangle is compared to cached triangle vertex indices in the autostrip vertex cache.

The flow then proceeds to the decision block 910 where a determination is made as to how many cache hits (matches) are found in the autostrip vertex cache. If the number of hits is either zero or one, the flow moves to block 912, where the new trilist triangle is processed as a conventional trilist triangle in the geometry pipeline If the number of hits is equal to two, the flow moves to block 916. At block 916 the new trilist triangle is converted to an autostrip triangle primitive type that contains the missed vertex of the three triangle vertices of the new trilist triangle, as well as the two "hit" vertices in which a match was found in the autostrip vertex cache. The flow then proceeds to block 918. At block 918, an index of the "miss" vertex of the new trilist triangle is stored in the autostrip vertex cache. In so doing, if the autostrip vertex cache is full, an oldest entry in the autostrip vertex cache is deleted.

If, at block 910, three hits are found, the flow moves to block 914. At block 914, the third triangle vertex index of the new trilist triangle is designated as a "miss" index. The flow then proceeds to block 916.

Figure 10:
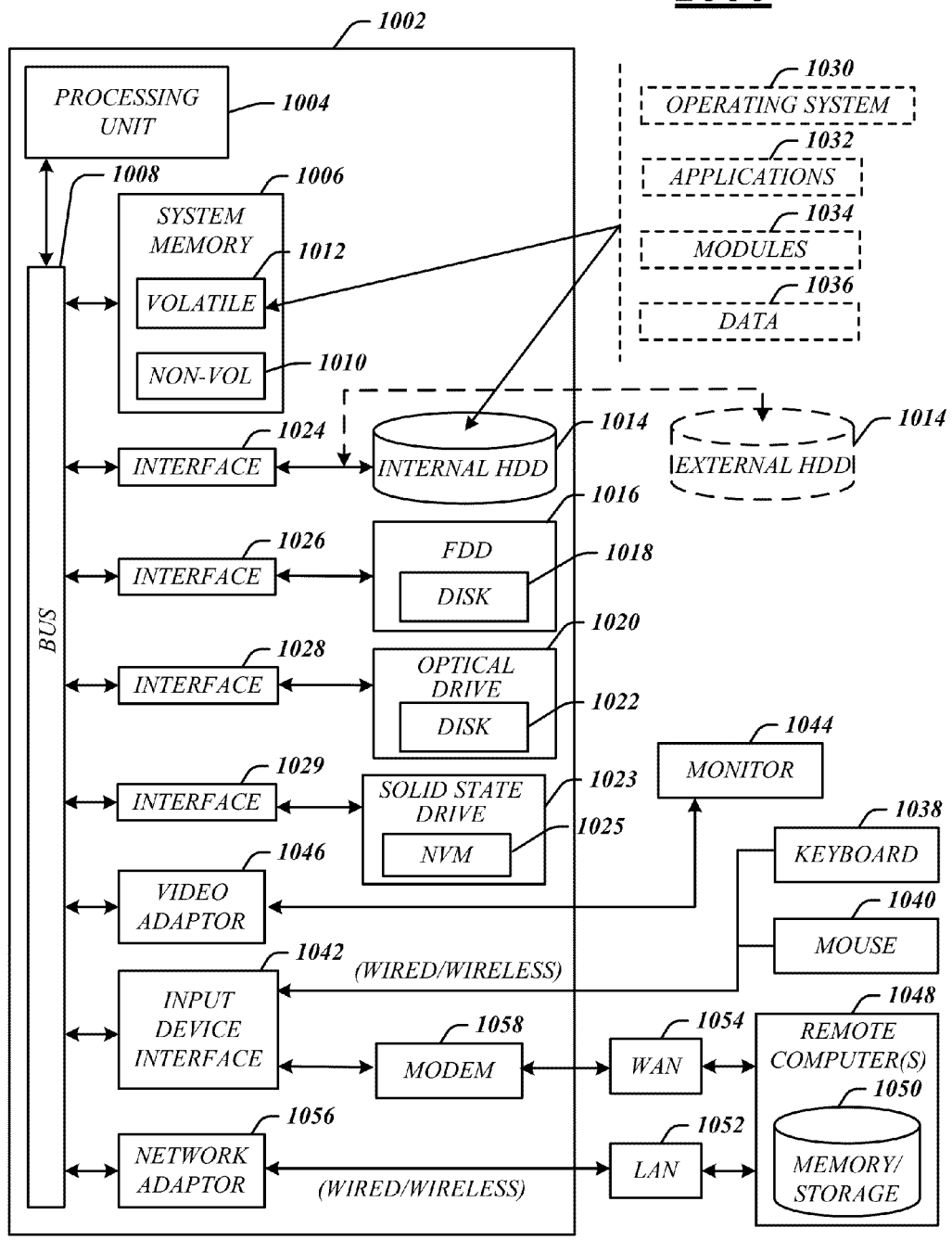
FIG. 10 is a diagram of an exemplary system embodiment.

FIG. 10 illustrates an embodiment of an exemplary computing architecture 1000 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1000 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors. Dual microprocessors and other multi-processor architectures may also be employed as the processing unit 1004. The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures.

The computing architecture 1000 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD); and a solid state drive (SSD) 1023 to read or write data to/from a non-volatile memory (NVM) 1025, including a NAND flash memory, phase change memory (PCM), a spin memory; phase change memory with switch (PCMS), magnetoresistive random access memory (MRAM), spin memory, nanowire memory, ferroelectric transistor random access memory (FeTRAM). The HDD 1014, FDD 1016, optical disk drive 1020, and solid state drive 1023 can be connected to the system bus 1008 by a HDD interface 1024, an FDD interface 1026, an optical drive interface 1028, and a solid state drive interface 1029, respectively. The HDD interface 1024 for external drive implementations can include at least one or both of Universal Serial Bus (USB) and IEEE 1294 interface technologies. The solid state drive interface 1029 may comprise any suitable interface for coupling to the host device, such as, for example, but not limited to, a serial advanced technology attachment (SATA) interface, a serial attached SCSI (SAS) interface, a universal serial bus (USB) interface, a peripheral control interface (PCI), or other suitable device interface.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036.

A user can enter commands and information into the computer 1002 through one or more wire/wireless input devices, for example, a keyboard 1038 and a pointing device, such as a mouse 1040. Other input devices may include a microphone, an infra-red (IR) remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1294 serial port, a game port, a USB port, an IR interface, and so forth.

A monitor 1044 or other type of display device is also connected to the system bus 1008 via an interface, such as a video adaptor 1046. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a memory to store a set of triangle vertices of a triangle, a processor circuit coupled to the memory, and a cache to hold a set of triangle vertex indices corresponding to triangle vertices most recently transmitted through a graphics pipeline. The apparatus may also include an autostrip vertex processing component operative on the processor circuit to receive from the memory the set of triangle vertices, compare an index for each vertex of the set of triangle vertices to determine matches to the set of cached triangle vertex indices, and to shift a single vertex index into the autostrip vertex cache, the single vertex index corresponding to a vertex miss in which a given vertex of the set of triangle vertices does not match any vertex index of the set of cached triangle vertex indices when exactly two matches to the set of cached triangle vertex indices are found.

In another embodiment, the cache may comprise an autostrip vertex cache, and the set of cached vertex indices may comprise N most recently transmitted vertex indices, N being an integer greater than two.

Alternatively, or in addition, in a further embodiment, the autostrip vertex processing component may be operative on the processor circuit to delete an oldest entry of the set of cached triangle vertex indices when two matches are found.

Alternatively, or in addition, in a further embodiment, the autostrip vertex processing component may be operative on the processor circuit to shift a vertex index for each vertex of the set of triangle vertices into the cache when zero or one match to the set of cached triangle vertex indices is found.

Alternatively, or in addition, in a further embodiment, the autostrip vertex processing component may be operative on the processor circuit to designate a vertex index for a single vertex of the set of triangle vertices for storage in the cache; and shift the designated vertex index into the cache for storage when three matches to the set of cached triangle vertex indices are found.

Alternatively, or in addition, in a further embodiment, the autostrip vertex processing component may be operative on the processor circuit to provide control information with the set of triangle vertex indices, the control information including an order of the set of triangle vertices.

Alternatively, or in addition, in a further embodiment, the control information may comprise an order of the single vertex index and first and second vertex indices corresponding to vertices providing the two matches to the set of stored vertex indices.

Alternatively, or in addition, in a further embodiment, the autostrip vertex processing component may be operative on the processor circuit to cache results of vertex clip testing and computed vertex positions of the set of triangle vertices in a data portion of an autostrip vertex cache.

Alternatively, or in addition, in a further embodiment, the autostrip vertex processing component may be operative on the processor circuit to cache in a data portion of an autostrip vertex cache information obtained and/or generated for a vertex in a setup stage of the geometry pipeline.

Alternatively, or in addition, in a further embodiment, the apparatus may include a digital display to present an image generated from the triangle vertex indices.

In a further embodiment, a computer implemented method may include receiving from memory a set of triangle vertices in a triangle for processing in a graphics geometry pipeline, comparing an index for each vertex of the set of triangle vertices to determine matches to a set of cached triangle vertex indices stored in a cache and corresponding to triangle vertices most recently transmitted through a graphics pipeline, and, when exactly two matches to the set of cached triangle vertex indices are found, shifting a single vertex index into the cache, the single vertex index corresponding to a vertex miss in which a given vertex of the set of triangle vertices does not match any vertex index of the set of cached triangle vertex indices.

In another embodiment of the computer implemented method, the set of cached vertex indices comprising N most recently transmitted vertex indices, N being a number greater than two.

Alternatively, or in addition, in a further embodiment, the computer implemented method may comprise deleting an oldest entry of the set of cached triangle vertex indices when two matches are found.

Alternatively, or in addition, in a further embodiment, the computer implemented method may comprise, when zero or one match to the set of cached triangle vertex indices is found, shifting a vertex index for each vertex of the set of triangle vertices into the cache.

Alternatively, or in addition, in a further embodiment, the computer implemented method may comprise, when three matches are found designating a vertex index for a single vertex of the set of triangle vertices for storage in the cache and shifting the designated vertex index into the cache for storage.

Alternatively, or in addition, in a further embodiment, the computer implemented method may comprise providing control information with the set of triangle vertex indices, the control information including an order of the set of triangle vertices, the order including an order of the single vertex index and first and second vertex indices corresponding to vertices providing the two matches to the set of cached triangle vertex indices.

Alternatively, or in addition, in a further embodiment, the computer implemented method may comprise caching in a data portion of the cache information obtained and/or generated for a vertex in a setup stage of the geometry pipeline.

Alternatively, or in addition, in a further embodiment, the computer implemented method may comprise caching results of vertex clip testing and computed vertex positions of the set of triangle vertices in a data portion of the cache.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory to store a set of triangle vertices of a triangle;
a processor circuit coupled to the memory;
a cache to hold a set of triangle vertex indices corresponding to triangle vertices most recently transmitted through a graphics pipeline; and
an autostrip vertex processing component operative on the processor circuit to:
receive the set of triangle vertices;
compare an index for each vertex of the set of triangle vertices to determine matches to the set of cached triangle vertex indices;
when exactly two matches to the set of cached triangle vertex indices are found, shift a single vertex index into the cache, the single vertex index corresponding to a vertex miss in which a given vertex of the set of triangle vertices does not match any vertex index of the set of cached triangle vertex indices; and
when three matches to the set of cached triangle vertex indices are found, designate a vertex index for a single vertex of the set of triangle vertices for storage in the cache, and shift the designated vertex index into the cache for storage.

2. The apparatus of claim 1, the cache comprising an autostrip vertex cache, and the set of cached vertex indices comprising N most recently transmitted vertex indices, N being an integer greater than two.

3. The apparatus of claim 1, the autostrip vertex processing component operative on the processor circuit to delete an oldest entry of the set of cached triangle vertex indices when two matches are found.

4. The apparatus of claim 1, the autostrip vertex processing component operative on the processor circuit to shift a vertex index for each vertex of the set of triangle vertices into the cache when zero or one match to the set of cached triangle vertex indices is found.

5. The apparatus of claim 1, the autostrip vertex processing component operative on the processor circuit to provide control information with the set of triangle vertex indices, the control information including an order of the set of triangle vertices.

6. The apparatus of claim 5, the control information comprising an order of the single vertex index and first and second vertex indices corresponding to vertices providing the two matches to the set of stored vertex indices.

7. The apparatus of claim 1, the autostrip vertex processing component operative on the processor circuit to cache results of vertex clip testing and computed vertex positions of the set of triangle vertices in a data portion of an autostrip vertex cache.

8. The apparatus of claim 1, the autostrip vertex processing component operative on the processor circuit to cache in a data portion of an autostrip vertex cache information obtained and/or generated for a vertex in a setup stage of the geometry pipeline.

9. The apparatus of claim 1, comprising a digital display to present an image generated from the triangle vertex indices.

10. At least one non-transitory computer-readable storage medium comprising instructions that, when executed, cause a system to:
receive from a memory a set of triangle vertices;
compare an index for each vertex of the set of triangle vertices to determine matches to a set of cached triangle vertex indices stored in a cache and corresponding to triangle vertices most recently transmitted through a graphics pipeline;

when exactly two matches to the set of cached triangle vertex indices are found shift a single vertex index into the cache, the single vertex index corresponding to a vertex miss in which a given vertex of the set of triangle vertices does not match any vertex index of the set of cached triangle vertex indices; and when three matches to the set of cached triangle vertex indices are found, designate a vertex index for a single vertex of the set of triangle vertices for storage in the cache and shift the designated vertex index into the cache for storage.

11. The at least one computer-readable storage medium of claim 10 comprising instructions that, when executed, cause a system to delete an oldest entry of the set of cached triangle vertex indices when two matches are found.

12. The at least one computer-readable storage medium of claim 10 comprising instructions that, when executed, cause a system to shift a vertex index for each vertex of the set of triangle vertices into the cache when zero or one match to the set of cached triangle vertex indices is found.

13. The at least one computer-readable storage medium of claim 10 comprising instructions that, when executed, cause a system to provide control information with the set of triangle vertex indices, the control information including an order of the set of triangle vertices.

14. The at least one computer-readable storage medium of claim 13, the control information comprising an order of the single vertex index and first and second vertex indices corresponding to vertices providing the two matches to the set of cached triangle vertex indices.

15. The at least one computer-readable storage medium of claim 10 comprising instructions that, when executed, cause a system to cache computed vertex positions and results of vertex clip testing.

16. The at least one computer-readable storage medium of claim 10 comprising instructions that, when executed, cause a system to cache results of vertex clip testing and computed vertex positions of the set of triangle vertices in a data portion of the cache.

17. The at least one computer-readable storage medium of claim 10 comprising instructions that, when executed, cause a system to cache in a data portion of the cache information obtained and/or generated for a vertex in a setup stage of the geometry pipeline.

18. A computer-implemented method, comprising:

receiving from memory a set of triangle vertices in a triangle for processing in a graphics geometry pipeline;

comparing an index for each vertex of the set of triangle vertices to determine matches to a set of cached triangle vertex indices stored in a cache and corresponding to triangle vertices most recently transmitted through a graphics pipeline;

when exactly two matches to the set of cached triangle vertex indices are found shifting a single vertex index into the cache, the single vertex index corresponding to a vertex miss in which a given vertex of the set of triangle vertices does not match any vertex index of the set of cached triangle vertex indices; and when three matches to the set are found, designating a vertex index for a single vertex of the set of triangle vertices for storage in the cache and shifting the designated vertex index into the cache for storage.

19. The computer implemented method of claim 18, the set of cached vertex indices comprising N most recently transmitted vertex indices, N being a number greater than two.

20. The computer implemented method of claim 18 comprising, deleting an oldest entry of the set of cached triangle vertex indices when two matches are found.

21. The computer implemented method of claim 18, comprising, when zero or one match to the set of cached triangle vertex indices is found shifting a vertex index for each vertex of the set of triangle vertices into the cache.

22. The computer implemented method of claim 18, comprising providing control information with the set of triangle vertex indices, the control information including an order of the set of triangle vertices, the order including an order of the single vertex index and first and second vertex indices corresponding to vertices providing the two matches to the set of cached triangle vertex indices.

23. The computer implemented method of claim 18 comprising caching in a data portion of the cache information obtained and/or generated for a vertex in a setup stage of the geometry pipeline.

24. The computer implemented method of claim 18 comprising caching results of vertex clip testing and computed vertex positions of the set of triangle vertices in a data portion of the cache.

* * * * *